United States Patent [19]
Jepsen et al.

[11] Patent Number: 5,644,201
[45] Date of Patent: Jul. 1, 1997

[54] ADJUSTABLE HEIGHT PODIUM

[75] Inventors: Thomas Laurann Jepsen, Brentwood, Calif.; Rural W. Gifford, Nampa, Id.; Neil A. Arnold, 4502 S. Chicago, Nampa, Id. 83686

[73] Assignee: Neil A. Arnold, Nampa, Id.

[21] Appl. No.: 428,056

[22] Filed: Apr. 25, 1995

[51] Int. Cl.$^6$ .................................................. H02P 1/00
[52] U.S. Cl. ........................ 318/283; 318/268; 318/754; 318/778; 318/560
[58] Field of Search ................................. 318/283, 268, 318/280, 754, 775, 778, 782, 560; 361/166, 160; 335/68, 69; 312/319.5; 248/128

[56] References Cited

U.S. PATENT DOCUMENTS 4,147,297  4/1979  Worst ................................. 361/166 X
5,077,512  12/1991  Weber ............................... 318/775 X
5,528,120  6/1996  Brodetsky ......................... 318/778 X

*Primary Examiner*—Karen Masih
*Attorney, Agent, or Firm*—Frank J. Dykas

[57] ABSTRACT

The invention is a motor-driven adjustable height podium having motor control circuitry with up and down relays for directing current through the electric motor to raise or lower the podium. The relay circuitry is specially configured to avoid a short circuit condition should a situation occur in which both the up and down relays are shut at the same time. Up and down limit switches limit the maximum vertical travel of the podium. A protective circuit breaker and isolation switch are also provided. The unit is designed to be powered from a standard 110 volt wall socket, for powering the motor, and a 24 volt power supply, for powering the relays.

10 Claims, 4 Drawing Sheets

ADJUSTABLE HEIGHT PODIUM

BACKGROUND OF THE INVENTION

1. Technical Field

This invention generally relates to podiums, and in particular, it relates to a motor-driven, adjustable height podium having a relay circuit for controlling the motor which is configured to avoid a short-circuit condition in the event relays should stick shut.

2. Background

The podium serves a variety of functions for a speaker. Among these are supporting the speaker's reading material, providing a leaning surface for the speaker, and providing a security barrier between the speaker and his audience. Podiums are used in a variety of speaking settings from business to entertainment to religious ceremonies, being known in the latter as pulpits. While speakers come in all different sizes, a given podium is typically limited to a fixed height. Height incompatibility between the speaker and podium can make it difficult and uncomfortable for the speaker to read from, or to lean on, the podium. For example, a speaker who is too tall for the podium will have to hunch over to use the podium, while a speaker who is too short will have to strain upwards and may even be substantially eclipsed by a high podium. This problem is exacerbated in the case of children who may be completely precluded from using a podium without auxiliary height adjusters, such as stairs, boxes, etc.

Podiums have been developed which contain built-in height adjustment features. One example is Richardson, U.S. Pat. No. 3,936,109, which teaches a portable podium having a pedestal consisting of a plurality of threaded pipe sections interconnected by threaded couplings. By varying the number of pipe sections employed, the pedestal links and hence the height of the podium, may be adjusted to an extent. Also known in the art are powered adjustable height podiums which typically use an electric motor to provide the motive force for raising and lowering, and thereby adjusting the height of the podium to suit the speaker. Motor control circuitry comprising up and down relays is typically utilized to send current through the motor windings as appropriate for raising or lowering the podium.

Prior art FIG. 1 shows an example of typical prior art podium motor control relay circuitry showing the relays open (de-energized). A common problem with such circuitry is the occurrence of a short circuit condition in situations when both the up and down relays were shut, or energized, at the same time. An example of how such a situation could occur is provided by that of children playing on a prior art motorized adjustable height podium. If a child should sit on the height adjustable part of the podium, and move the podium control switch to up, thus shutting the up relays in the motor control circuitry, the motor windings would draw an unusually large current, the system being designed to move the weight of papers and the like, rather than the multiple pounds of a child. Depending on the weight of the child, the size of the current drawn might be sufficient to fuse the up relays shut. Then, when the down direction was selected on the control switch, thus shutting the down relays in the motor control circuitry, a short circuit condition was created between the hot and neutral power leads; for example through points A, B, C, D, E, F and G in FIG. 1. The result was electrical destruction of the relays and other control circuit components. Furthermore, because these prior art motor control circuits were configured on printed circuit boards, replacement of one damaged component necessitated replacement of the entire printed circuit board into which that component was integrated.

Accordingly, it is an object of the present invention to provide a motor-driven, adjustable height podium with motor control circuitry in which a short circuit is avoided in the event that both up and down relays should be shut at the same time.

It is another object of the present invention to provide a motor driven, adjustable-height podium with motor control circuitry which utilizes individual components connected together by standard copper wires, rather than printed circuit boards, so that the components, such as relays, are easily replaceable when damaged.

DISCLOSE OF INVENTION

These objects and a first, second, and third others are satisfied by means of a motor-driven, adjustable-height podium having a first, second, and third up and down relays each with a first, a second, and a third terminal. In the best mode of the invention, the first, second, and third terminal may be referred to as "pin". The relays are configured to avoid a short circuit condition in the event that both the up and down relays are shut at the same time. The circuitry utilizes individual components, such as relays, connected together by standard copper wires, rather than by printed circuit boards. Individual components are thus easily replaceable when damaged. Should a situation occur in which the up and down relays are shut at the same time, the circuitry is designed to direct current through the motor windings such that the podium moves in the downward direction.

The adjustable height podium of the invention is comprised of a box-like base section and a box-like lectern section disposed within, and projecting upward from, the base section. An electric motor held within the base section, operating through a worm gear, imparts a force to raise or lower the lectern section, depending upon the direction of rotation of the motor. Up and down limit switches placed a vertical distance apart on the base section, and acting in concert with an L-bracket which moves up and down with the lectern section, limit the maximum vertical travel of the lectern section. When the L-bracket contacts either limit switch, power to the motor is interrupted, stopping the motion of the lectern. The relay circuitry, the starting capacitator and a protective circuit breaker are contained within a control circuitry box attached to the base section. A power and control lead junction box, which also houses an isolation switch, is also provided within the base section. The unit is designed to be powered from a standard 110 volt wall socket, for powering the motor, and an external 24 volt power supply, for powering the relays.

BEST MODE FOR CARRYING OUT INVENTION

Figure 1:
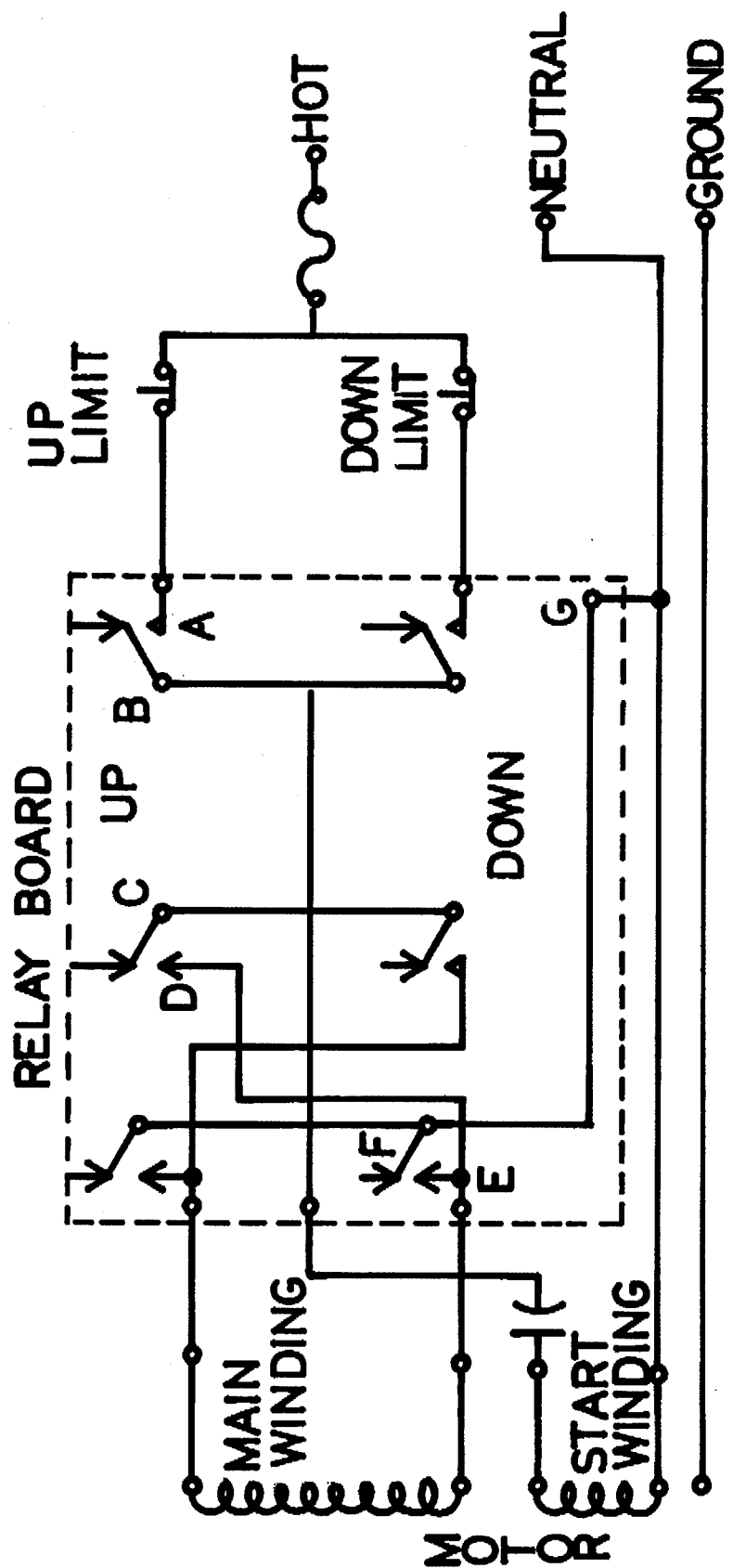
FIG. 1 (prior art) is a circuit schematic of a prior art motor control circuit for a motorized, adjustable height podium.
Figure 2:
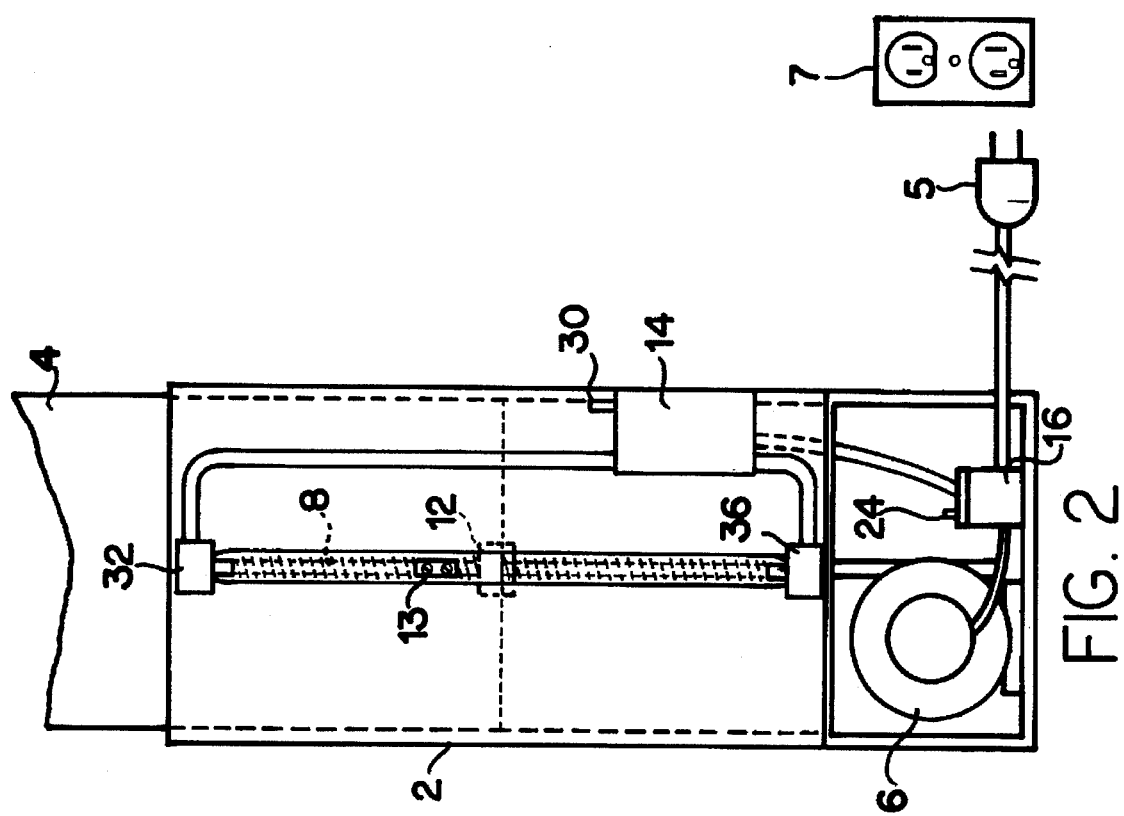
FIG. 2 is a side elevation view of a motorized adjustable height podium.

FIG. 2 depicts the main components of a motorized adjustable height podium. Base section 2, which sits on the floor, is a box-like structure which contains or supports the mechanical and electrical components which raise or lower lectern section 4. Lectern section 4 is a box-like structure projecting vertically out of base section 2 and which may be adjusted over a continuous range of heights between predetermined limits to suit the height of a speaker. Power for the podium motor 6 is provided through plug 5 which may be inserted in a standard 110 volt wall socket 7. Junction box 16 houses power isolation switch 24, as well as providing a power and control circuitry junction point. Motor 6 is a standard armature type electric motor sized to provide sufficient output to raise and lower lectern section 4. The rotational force of motor 6 is transferred to worm gear 8. Nut 12 is fixably attached to lectern section 4 and has grooves which engage worm gear 8. Thus, the rotational force of worm gear 8 is through nut 12 translated into vertical force for raising and lowering lectern section 4.

Control circuitry box 14 houses most of the motor control circuitry and other electrical components for operating motor 6. Circuit breaker reset switch 30 projects from control circuitry box 14. Limit switches 32 and 36 fixedly attached to base section 2, and electrically connected to control circuitry box 14, cut off power to motor 6 when lectern section 4 reaches its maximum limits of up and down, respectively, travel. Angle bracket 13, fixedly attached to lectern section 4, is situated so as to trip limit switches 32 and 36 in concert with the motion of lectern section 4.

Figure 3:
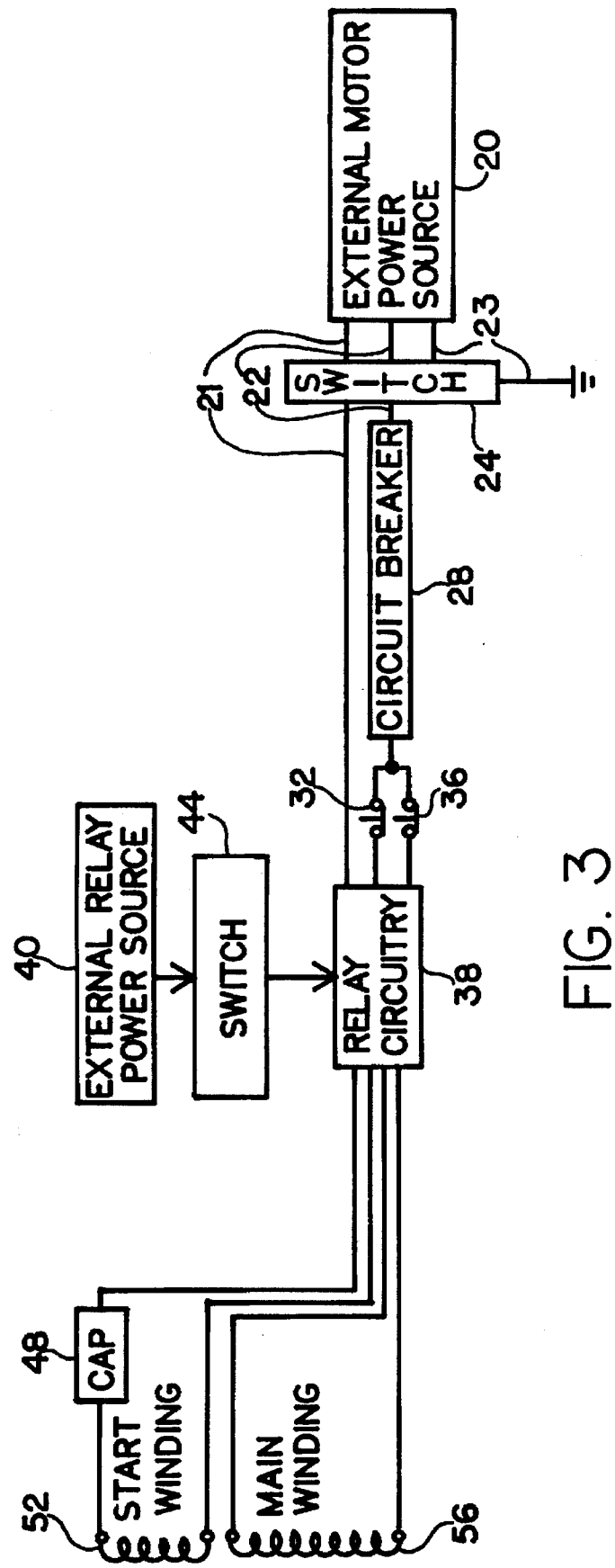
FIG. 3 is a block diagram schematic of the adjustable height podium motor control and power circuitry of the present invention.

Referring now to FIG. 3, wherein is depicted a block diagram of the power and control circuitry for motor 6, external motor power source 20 has neutral, hot and ground lines 21, 22 and 23, respectively. In the preferred embodiment, external motor power source 20 is 110 volts from a standard wall socket. Neutral 21, hot 22 and ground 23 lines are connected to the rest of the circuitry through power isolation switch 24 which provides power isolation to the rest of the circuitry during long idle periods or maintenance situations. Protective circuit breaker 28 interrupts hot power line 22 should an excessively high current flow condition occur. Up limit switch 32 and down limit switch 36 also interrupt the current flow through hot lead 22 when the lectern section 4 has reached its predetermined limits of up and down, respectively, travel.

Relay circuitry 38 provides the switching circuitry for directing current through the start winding 52 and main winding 56 of motor 6 as necessary to raise or lower lectern section 4. External relay power source 40 provides the power for operating relay circuitry 38. In the preferred embodiment, external relay power source 40 is twenty-four volts from an audio system power supply. Manual control switch 44, having three positions (up, down and hold), varies the power to relay circuitry 38 as necessary to raise or lower the lectern section 4 as desired. In the up position, up relays 70, 72 and 74 are energized, in the down position, down relays 80, 82 and 84 are energized, and in the hold position, no relays are energized. Capacitor 48 provides the necessary current boost to start winding 52 for starting the motor 6.

Figure 4:
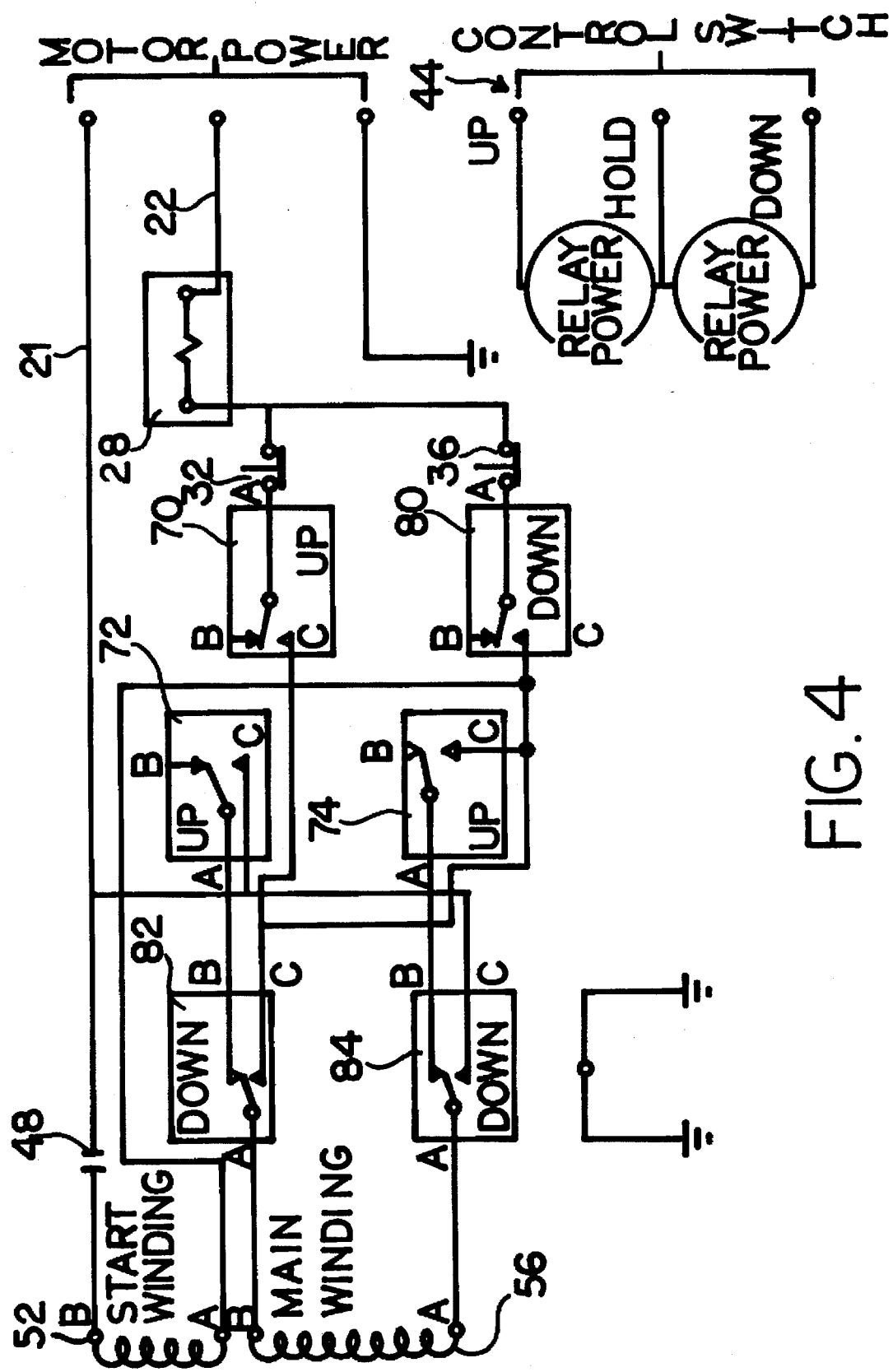
FIG. 4 is a circuit schematic of the motor control circuitry of the present invention.

FIG. 4 is a schematic showing in detail the relay circuitry for controlling current to the motor start windings 52 and main windings 56. Single pole up relay 70 works in tandem with single pole up relays 72 and 74, while single pole down relay 80 works in tandem with single pole down relays 82 and 84. Each relay has 3 pins, A, B, and C, and all relays are shown in their deenergized (open) position with pin A electrically interconnected to pin B. When a relay is energized, pin A is electrically interconnected to pin C. Up relays 70, 72 and 74 are energized (shut) when control switch 44 is in the up position. Down relays 80, 82 and 84 are energized (shut) when control switch 44 is in the down position.

The operation of the relay circuitry is as follows: When control switch 44 is moved to the up position, energizing up relays 70, 72 and 74, current will flow via hot lead 22 through circuit breaker 28, through up limit switch 32, through pins A and C of relay 70, then in parallel through motor start winding 52 to neutral lead 21 and through pins C and A of up relay 74, through pins B and A of down relay 84, up through motor main windings 56, through pins A and B of down relay 82, through pins A and C of up relay 72, and out through neutral lead 21. Motor 6 will operate to cause lectern section 4 to move upward. If, during up motor operation, the upper limit of lectern forward travel should be reached, up limit switch 32 will open interrupting the up circuit path, and stopping the motor.

When control switch 44 is moved to the down position, energizing down relays 80, 82 and 84 to move lectern section 4 downward, current flows via hot leads 22 through circuit breaker 28, through down limit switch 36, through pins A and C of down relay 80, in parallel through start winding 52 and to neutral lead 21 and through pins C and A of down relay 82, down through motor main winding 56, through pins A and C of down relay 84, and out through neutral lead 21. As with motion in the up direction, opening of down limit switch 36 will interrupt the circuit and stop the motor. Should an excessive current condition occur during either up or down motion, protective circuit breaker 28 will open to interrupt the current flow.

The new short circuit prevention feature of the relay control circuitry arrangement can be demonstrated as follows: Should a situation arise within which up relays 70, 72 and 74, and down relays 80, 82 and 84 are shut at the same time, the circuit arrangement prevents a short circuit condition from occurring. For example, beginning at circuit breaker 28 and tracing current flow through hot lead 22, through up limit switch 32, through pins A and C of up limit switch 70, in parallel through motor start winding 52 and through pins C and A of down relay 82, down through motor main winding 56, through pins A and C of down relay 84 and out through neutral lead 21. The motor will thus be energized in the down direction and lectern section 4 will move downward. Starting again at circuit breaker 28 and tracing the current flow down through down limit switch 36, through pins A and C of down relay 80, in parallel through motor start winding 52 and pins C and A of down relay 82, down through motor main winding 56, through pins A and C of down relay 84, and out through neutral lead 21. This current path also results in current flow through motor main winding 56 to cause lectern section 4 to move downward.

Thus, when both the up and down relays are shut at the same time, no short circuit condition occurs and current flows through motor main winding 56 such that lectern section 4 is lowered until its downward limit of travel is reached and down limit switch 36 opens, stopping the motor.

It should be noted that the circuitry of the invention uses individual componenets, such as relays, connected together by standard copper wires, rather than printed circuit boards. Individual components are thus easily replaced when damaged.

While there is shown and described the present preferred embodiment of the invention, it is to be distinctly understood that this invention is not limited thereto but may be variously embodied to practice within the scope of the following claims.

I claim:

1. A motor-driven, adjustable-height podium being powered from an external motor power source having hot and neutral leads, and an external relay power source comprising:

a base section;

a lectern section slidably attached to the base section for generally vertical extension up from, and retraction down toward the base section;

and a reversible electric motor fixedly attached to the base section having start and main windings, each winding having first and second terminals, wherein the second terminal of the start winding is connected to the power source neutral lead, and having means drivingly connecting the motor to the lectern section for moving the lectern section relative to the base section;

a first, a second and a third up relay and a first, a second and a third down relay, each having a de-energized and an energized position and each having a first, a second and a third terminal for directing power to the motor windings for vertical extension and retraction of the lectern section, wherein the first and second terminals of each relay are electrically interconnected when the relay is de-energized, and the first and third terminals are electrically interconnected when the relay is energized, wherein the third terminal of the first up relay is connected both to the third terminal of the second down relay and to the first terminal of the motor start winding, the third terminal of the first down relay is connected to the third terminal of the first and third up relays, and to the third terminal of the second down relay and to the first terminal of the motor start winding, the first terminal of the second up relay is connected to the second terminal of the second down relay, the third terminal for the second up relay is connected to both the third terminal of the third down relay and the second terminal of the motor start winding, the first terminal of the second down relay is connected to the second terminal of the motor main winding, the first terminal of the third up relay is connected to the second terminal of the third down relay, and the first terminal of the third down relay is connected to the first terminal of the motor main winding;

an up and a down limit switch for cutting off power to the motor when the lectern section reaches predetermined limits of up or down, respectively, travel fixedly attached to the base section, each having an input and an output terminal, wherein the up limit switch output terminal is connected to the first terminal of the first up relay and the down limit switch output terminal is connected to the first terminal of the first down relay; and a manual control switch electrically connected to the relay power source for energizing the first, second and third up and down relays.

2. The podium of claim 1 further comprising a protective circuit breaker interruptably and electrically interconnecting the hot power lead with the input terminals of the up and down limit switches.

3. The podium of claim 1 further comprising a capacitor for starting the motor electrically interconnecting the third terminals of the second up relay and third down relay with the second terminal of the motor start winding.

4. The podium of claim 1 further comprising a shutoff switch for isolating the motor and relay circuitry from the power leads.

5. A motor-driven, adjustable-height podium being powered from an external motor power source having hot and neutral leads, and an external relay power source comprising:

a base section;

a lectern section slidably attached to the base section for generally vertical extension from, and retraction down toward the base section;

and a reversible electric motor fixedly attached to the base section having start and main windings, each winding having first and second terminals, wherein the second terminal of the start winding is connected to the power source neutral lead, and having said means drivingly connecting the motor to the lectern section for moving the lectern section relative to the base section;

a first, a second and a third up relay and a first, a second and a third down relay, each having a de-energized and an energized position and each having a first, a second and a third terminal for directing power to the motor windings for vertical extension and retraction of the lectern section, wherein the first and second terminals of each relay are electrically interconnected when the relay is de-energized and the first and third terminals are electrically interconnected when the relay is energized, wherein the third terminal of the first up relay is connected both to the third terminal of the second down relay and to the first terminal of the motor start winding, the third terminal of the first down relay is connected to the third terminal of the first and third up relays, and to the third terminal of the second down relay and to the first terminal of the motor start winding, the first terminal of the second up relay is connected to the second terminal of the second down relay, the third terminal of the second up relay is connected to both the third terminal of the third down relay and the second terminal of the motor start winding, the first terminal of the second down relay is connected to the second terminal of the motor main winding, the first terminal of the third up relay is connected to the second terminal of the third down relay, and the first terminal of the third down relay is connected to the first terminal of the motor main winding;

an up and a down limit switch for cutting off power to the motor when the lectern section reaches predetermined limits of up or down, respectively, travel fixedly attached to the base section, each having an input and an output terminal, wherein the up limit switch output terminal is connected to the first terminal of the first up relay and the down limit switch output terminal is connected to the first terminal of the first down relay;

a protective circuit breaker interruptably and electrically interconnecting the hot power lead with the input terminals of the up and down limit switches;

a capacitor for starting the motor electrically interconnecting the third terminals of the second up relay and third down relay with the second terminal of the motor start winding;

a manual control switch electrically connected to the relay power source for energizing the first, second and third up and down relays; and a shutoff switch for isolating the motor and relay circuitry from the power leads.

6. The podium of claim 5 wherein the means for drivingly connecting the motor to the lectern section comprises a worm gear.

7. The podium of claim 6 further comprising a nut fixedly attached to the lectern section having grooves engaging the worm gear for transferring force from the worm gear to raise and lower the lectern section.

8. The podium of claim 5 wherein the motor and relay circuitry are attached to the base section.

9. The podium of claim 5 wherein the motor and shutoff switch are contained within the base section.

10. The podium of claim 5 further comprising a circuit box in which the relays and capacitor are enclosed.

* * * * *